United States Patent
Kitamura et al.

(10) Patent No.: US 7,465,347 B2
(45) Date of Patent: Dec. 16, 2008

(54) YELLOW INK COMPOSITION, INK SET, INK CARTRIDGE, INKJET RECORDING METHOD, AND RECORDED MATTER

(75) Inventors: Kazuhiko Kitamura, Matsumoto (JP); Akihito Sao, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/881,824

(22) Filed: Jul. 27, 2007

(65) Prior Publication Data

US 2008/0145561 A1 Jun. 19, 2008

(30) Foreign Application Priority Data

Jul. 27, 2006 (JP) .............................. 2006-205231

(51) Int. Cl.
C09D 11/00 (2006.01)
C09D 11/02 (2006.01)
B41J 2/01 (2006.01)

(52) U.S. Cl. .................................. 106/31.48; 347/100
(58) Field of Classification Search .............. 106/31.48; 534/758, 797; 347/100; 427/466
See application file for complete search history.

(56) References Cited

U.S. PATENT DOCUMENTS

| | | | |
|---|---|---|---|
| 4,661,158 A * | 4/1987 | Kobayashi et al. | 106/31.48 |
| 6,605,144 B1 * | 8/2003 | Watkinson et al. | 106/31.48 |
| 6,786,571 B2 * | 9/2004 | Fukumoto et al. | 347/43 |
| 6,878,196 B2 * | 4/2005 | Harada et al. | 106/31.48 |
| 6,923,855 B2 * | 8/2005 | Harada et al. | 106/31.46 |
| 2006/0005744 A1 | 1/2006 | Kitayama et al. | |
| 2007/0109376 A1* | 5/2007 | Tojo et al. | 347/100 |
| 2008/0145562 A1* | 6/2008 | Kitamura et al. | 106/31.48 |
| 2008/0151028 A1* | 6/2008 | Yamakami et al. | 347/100 |
| 2008/0199615 A1* | 8/2008 | Harada et al. | 106/31.48 |

FOREIGN PATENT DOCUMENTS

| | | |
|---|---|---|
| JP | 2000-154344 | 6/2000 |
| JP | 2000-345080 | 12/2000 |
| JP | 2002-285022 | 10/2002 |
| JP | 2002-540281 | 11/2002 |
| JP | 2002-371079 | 12/2002 |
| JP | 2005-105136 | 4/2005 |
| JP | 2005/320530 | 11/2005 |
| JP | 2006-57076 | 3/2006 |
| JP | 2007-191644 | 8/2007 |
| JP | 2007-197480 | 8/2007 |

| | | |
|---|---|---|
| WO | 2005/075573 | 8/2005 |

OTHER PUBLICATIONS

Patent Abstracts of Japan of JP 2005-105136 dated Apr. 21, 2005.
Patent Abstracts of Japan of JP 2002-371079 dated Dec. 26, 2002.
Patent Abstracts of Japan of JP 2000-154344 dated Jun. 6, 2000.
Patent Abstracts of Japan of JP 2000-345080 dated Dec. 12, 2000.
Patent Abstracts of Japan of JP 2005-320530 dated Nov. 17, 2005.
JPO computer English translation of JP 2007-197480 dated Aug. 9, 2007.
JPO computer English translation of JP 2007-191644 dated Aug. 2, 2007.

* cited by examiner

*Primary Examiner*—Helene Klemanski
(74) *Attorney, Agent, or Firm*—Ladas and Parry LLP

(57) ABSTRACT

A yellow ink composition, containing as a colorant at least one type of compound expressed by the following Formula I, and at least one type of compound expressed by the following Formula II:

[C1]

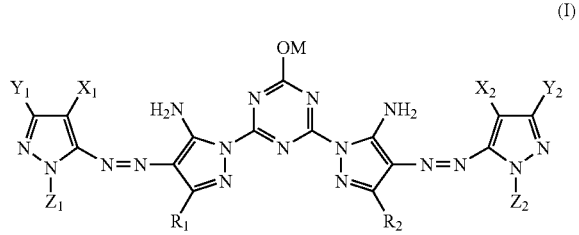

(I)

(where $X_1$, $X_2$, $Y_1$, and $Y_2$ are each a hydrogen atom or a cyano group, $Z_1$ and $Z_2$ are each a substituent having an aromatic ring, $R_1$ and $R_2$ are each an alkyl group, and M is a metal atom)

[C2]

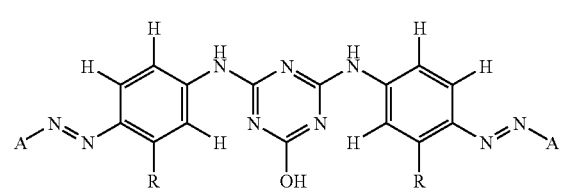

(II)

(where R is a methoxy group or methyl group, and A is 1,5-disulfonaphtho-3-yl or 1,5,7-trisulfonaphtho-2-yl).

15 Claims, No Drawings

YELLOW INK COMPOSITION, INK SET, INK CARTRIDGE, INKJET RECORDING METHOD, AND RECORDED MATTER

BACKGROUND

1. Technical Field

The present invention relates to a yellow ink composition that yields recorded matter with excellent print quality and that is also highly resistant to light and has excellent ozonefastness, and that allows hue adjustment and ozonefastness adjustment, has stable discharge reliability, and is favorable for inkjet recording, and to an ink set and an ink cartridge in which this composition is used, and to an inkjet recording method and recorded matter in which these are used.

2. Related Art

Inkjet recording is a known method in which droplets of an ink composition are discharged from a fine nozzle and adhere to the surface of a recording medium to record text or graphics. Inkjet recording methods that have seen practical application include (i) a method in which an electrostrictive element is used to convert an electrical signal into a mechanical signal, an ink composition stored in a nozzle head is intermittently discharged from the nozzle head according to this mechanical signal, and the ink composition adheres to a recording medium surface to record text or graphics, and (ii) a method in which the portion of the nozzle head that is extremely close to the discharge component is rapidly heated, bubbles are generated in an ink composition stored in the nozzle head portion, the volumetric expansion of the bubbles causes the ink composition to be intermittently discharged from the nozzle head, and the ink composition adheres to a recording medium surface to record text or graphics.

Today, a plurality of color ink compositions are readied and a color image is formed by inkjet recording. In general, a color image is formed by the three colors a yellow ink composition, a magenta ink composition, and a cyan ink composition, and in some cases by four colors additionally including a black ink composition. There are also cases in which a color image is formed by six colors (by adding a light cyan ink composition and a light magenta ink composition to the above four colors), or even seven colors (by further adding a dark yellow ink composition). An ink set is the product of thus combining two or more types of ink composition, and is usually used by being mounted in a printer in the form of an ink cartridge that accommodates this ink set.

The ink compositions used in inkjet recording are generally solutions obtained by dissolving various dyes in water, an organic solvent, or a mixture of these, and an ink composition used to form such a color image needs to have good color expression itself, and also needs to express good intermediate colors when a plurality of ink compositions are combined, not to fade in color over time when printed matter is stored, and so forth.

Also, through continuous improvement to heads, ink compositions, recording methods, and media, the printing of photographic images with a color inkjet printer has in recent years reached a level that is comparable to that of silver halide photographs, and image quality is now as good as that of photographs. Meanwhile, improvements to ink compositions and media have resulted in better storage stability of the resulting images. Lightfastness in particular has been improved to a level that no longer poses any practical problems.

Nevertheless, the quality has yet to equal that of silver halide photographs. The standard way to evaluate lightfastness performance is to use as an index the fading of patterns of pure color of yellow, magenta, and cyan (whose optical density is close to 1.0). When the lightfastness performance of ink compositions used in current printers that are available on the market is evaluated by the above method, a magenta ink composition has the lowest performance, and it is often the case that the lightfastness of an ink set is the determining factor in its service life.

Improving the lightfastness of a magenta ink composition is effective at extending the lightfastness service life of an ink set and increasing the lightfastness of a photographic image, so a great deal of developmental improvement has gone into new magenta ink compositions with excellent lightfastness service lives, and many proposals have been made (see JP-A-2005-105136 and JP-A-2002-371079, for example).

Accordingly, as the performance (lightfastness characteristics) of magenta inks has increased through these improvements to magenta inks, it has become essential to improve the characteristics of colorants of other colors used in ink sets, and particularly those of yellow inks.

Numerous improvements have been made in the past to yellow inks in which yellow colorants are used (see JP-A-2000-154344, JP-A-2000-345080, and JP-A-2005-320530, among others), and many of these have been put to practical use, but compared to magenta ink compositions that have undergone various improvements and seen practical application in recent years, conventional yellow inks (yellow ink compositions) have lower lightfastness and ozonefastness, and have poor variation in their yellow hues, and this makes it difficult to adjust their hue, among other drawbacks, and improvement is needed in this area.

SUMMARY

An advantage of some aspects of the invention is that it solves the above-mentioned problems and provides a yellow ink composition that allows hue adjustment and ozonefastness adjustment while maintaining high lightfastness, and that has stable discharge reliability, as well as an ink set and an ink cartridge in which this composition is used, and an inkjet recording method and recorded matter in which these are used.

As a result of detailed scrutiny of colorants for various yellow ink compositions that can be used for inkjet recording, combinations of these colorants, and so forth, the inventors discovered that if an ink composition contains a combination of yellow colorants with a specific structure as colorant components, the product will have excellent lightfastness and ozonefastness, and its hue can be adjusted while maintaining the above-mentioned characteristics, among other such effects, and were able to solve the above-mentioned problems by employing the following constitutions.

(1) A yellow ink composition, containing as a colorant at least one type of compound expressed by the following Formula I, and at least one type of compound expressed by the following Formula II:

[C1]

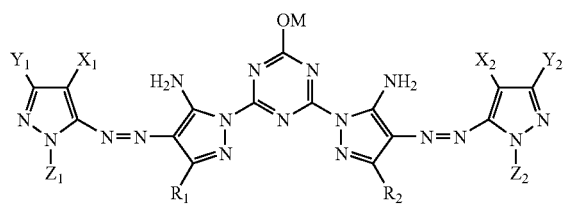

(where $X_1$, $X_2$, $Y_1$, and $Y_2$ are each a hydrogen atom or a cyano group, $Z_1$, and $Z_2$ are each a substituent having an aromatic ring, $R_1$ and $R_2$ are each an alkyl group, and M is a metal atom)

[C2]

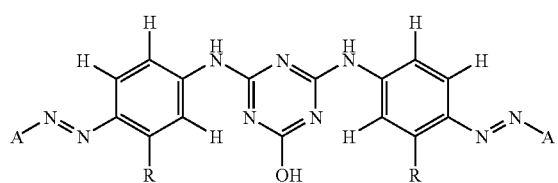

(II)

(where R is a methoxy group or methyl group, and A is 1,5-disulfonaphtho-3-yl or 1,5,7-trisulfonaphtho-2-yl).

(2) The yellow ink composition according to (1) above, wherein the compound expressed by Formula I is a compound expressed by the following Formula III:

[C3]

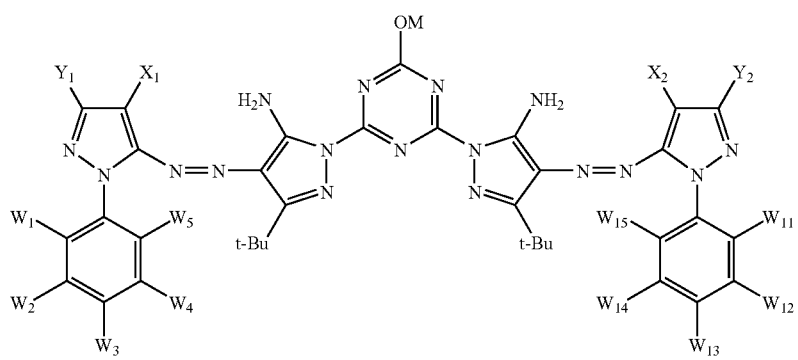

(III)

(where $X_1$, $X_2$, $Y_1$, and $Y_2$ are each a hydrogen atom or a cyano group, $W_1$ to $W_5$ and $W_{11}$ to $W_{15}$ are each a hydrogen atom or a carboxyl group or salt thereof, M is a metal atom, and t-Bu is a tertiary butyl group).

(3) The yellow ink composition according to (1) or (2) above, containing 0.3 to 7 wt % the at least one type of compound expressed by Formula I and 0.3 to 6.0 wt % the at least one type of compound expressed by Formula II, with respect to the total weight of the ink composition[1].

(4) The yellow ink composition according to any of (1) to (3) above, wherein the combined amount of colorant solids is from 0.6 to 7.0 wt % with respect to the total weight of the ink composition.

(5) The yellow ink composition according to any of (1) to (4) above, wherein the content ratio between the compound expressed by Formula I and the compound expressed by Formula II is a weight ratio between 5:1 and 1:5.

(6) The yellow ink composition according to any of (1) to (5) above, wherein the ink composition includes a nonionic surfactant.

(7) The yellow ink composition according to (6) above, wherein the nonionic surfactant is an acetylene glycol-based surfactant.

(8) The yellow ink composition according to (6) or (7) above, wherein the nonionic surfactant is contained in an amount of 0.1 to 5.0 wt % with respect to the total weight of the ink composition.

(9) The yellow ink composition according to any of (1) to (8) above, wherein the ink composition includes a penetration enhancer.

(10) The yellow ink composition according to (9) above, wherein the penetration enhancer is a glycol ether.

(11) An ink set used in an inkjet recording method, wherein at least the yellow ink composition according to any of (1) to (10) above is included as a constituent component.

(12) An ink cartridge, wherein the ink set according to (11) above is accommodated integrally or independently therein.

(13) An inkjet recording method for performing recording by discharging droplets of an ink composition and causing the droplets to adhere to a recording medium, wherein recording is performed using the ink set according to (11) above or the ink cartridge according to (12) above.

(14) Recorded matter, printed by the inkjet recording method according to (13) above.

The yellow ink composition of the present invention has the above constitution, and a colorant expressed by the above-mentioned Formula I and a colorant expressed by the above-mentioned Formula II are both contained therein as essential components, so the lightfastness is superior to that of a yellow ink composition containing neither of the colorants expressed by Formulas I and II as ink constituent components, and the hue of the resulting yellow ink composition can be easily adjusted by adjusting the ratio in which the compound expressed by Formulas I and II are contained in the ink composition.

Also, using a compound expressed by Formula I, which has better ozonefastness than a magenta ink composition or a cyan ink composition, together with a compound expressed by Formula II, which has worse ozonefastness than a magenta ink composition or a cyan ink composition, as colorants results in fading over time that is about the same as that of a magenta ink composition or a cyan ink composition, and when these compounds are combined with inks of other colors, such as a magenta ink composition or a cyan ink composition, and the resulting ink set is used to print a multicolor image, even though the ink composition may fade over time, the image will fade uniformly, which avoids discoloration of the recorded matter.

Accordingly, it is possible to provide a yellow ink, an ink set, and an ink cartridge that allow hue and ozonefastness to be adjusted without lowering the high lightfastness, and to provide a recording method and recorded matter in which these are used.

DESCRIPTION OF EXEMPLARY EMBODIMENTS

The ink composition of the present invention contains at least one type of colorant expressed by the above-mentioned Formula I and at least one type of colorant expressed by the above-mentioned Formula II, in water or in an aqueous solvent composed of water and a water-soluble organic solvent, and also contains as needed a humectant, surfactant, penetration enhancer, viscosity regulator, pH regulator, or other additives.

Combining a compound expressed by Formula I with a compound expressed by Formula II makes it possible to provide an ink composition that has excellent lightfastness and gasfastness, and that allows hue and ozonefastness to be adjusted without greatly diminishing lightfastness, by selecting the makeup of the compound expressed by Formula I and the compound expressed by Formula II and adjusting the content ratio, and therefore has well balanced characteristics.

As a preferred aspect of the yellow ink composition of the present invention, just as with a conventional ink composition, a nonionic surfactant or a penetration enhancer may each be added, either singly or as a combination of two or more types, as an additive.

The compound expressed by Formula I (yellow colorant) used in the present invention may be a single type used alone, or may be a mixture of a plurality of types.

In Formula I, $X_1$, $X_2$, $Y_1$, and $Y_2$ are each a hydrogen atom or a cyano group, $Z_1$ and $Z_2$ are each a substituent having an aromatic ring, $R_1$ and $R_2$ are each an alkyl group, and M is a metal atom.

Of the compounds expressed by Formula I, a compound expressed by Formula III is preferable. In Formula III, $X_1$, $X_2$, $Y_1$, and $Y_2$ are each a hydrogen atom or a cyano group, $W_1$ to $W_5$ and $W_{11}$ to $W_{15}$ are each a hydrogen atom or a carboxyl group or salt thereof, M is a metal atom, and t-Bu is a tertiary butyl group.

With the ink composition of the present invention, a compound expressed by Formula II (yellow colorant) is used in addition to the compound expressed by Formula I as a colorant. In Formula II, R is a methoxy group or methyl group, and A is 1,5-disulfonaphtho-3-yl or 1,5,7-trisulfonaphtho-2-yl.

Also, to the extent that lightfastness and other such characteristics are not significantly compromised, the yellow ink composition of the present invention may also contain, as needed, a colorant having a yellow color tone, such as a yellow dye such as C.I. Direct Yellow 8, 11, 12, 27, 28, 33, 39, 44, 50, 58, 85, 86, 87, 88, 89, 98, 100, 110, 132, and 173, or C.I. Acid Yellow 1, 3, 7, 11, 17, 23, 25, 29, 36, 38, 40, 42, 44, 76, 98, and 99, or a yellow pigment such as C.I. Pigment Yellow 74, 109, 110, 128, 150, or 154, in addition to the compound expressed by Formula I and the compound expressed by Formula II that are essential components, in order to adjust the color tone, etc.

The amount in which the compound expressed by Formula I is contained in the ink composition of the present invention is, as the combined weight, preferably 0.3 to 7.0 wt %, and more preferably 0.5 to 6.0 wt %, with respect to the total weight of the ink composition. Keeping the amount to at least 0.3 wt % ensures the required color expression, while keeping the amount to no more than 7.0 wt % allows good reliability against clogging and so forth to be ensured with ease.

The amount in which the compound expressed by Formula II is contained in the ink composition of the present invention is, as the combined weight, preferably 0.3 to 6.0 wt %, and more preferably 0.5 to 5.0 wt %, with respect to the total weight of the ink composition. Keeping the amount to at least 0.3 wt % ensures the required color expression, while keeping the amount to no more than 6.0 wt % allows good reliability against clogging and so forth to be ensured with ease.

The content ratio between the compound expressed by Formula I and the compound expressed by Formula II in the ink composition of the present invention is preferably a weight ratio between 5:1 and 1:5, and more preferably between 5:1 and 1:2. If the two compounds are contained in this ratio, the ink will be recognizable and yellow, and furthermore can be made into inks of different hue, and lightfastness, gasfastness, and moisturefastness can be satisfied to a high degree.

It is also preferable with the ink composition of the present invention for the combined amount of colorant solids to be from 0.6 to 7.0 wt % with respect to the total weight of the ink composition. Keeping the amount to at least 0.6 wt % allows the required color expression (maximum density) to be obtained, and keeping the amount to no more than 7.0 wt % allows good reliability against clogging and so forth to be ensured with ease.

The pH (20° C.) of the ink composition is preferably at least 8.0 so that the above-mentioned colorants and other constituent components will be stably dissolved. Also, when the materialfastness with the various members with which the ink composition comes into contact is taken into account, the pH of the ink composition is preferably no more than 10.5. To satisfy both of these requirements, the pH of the ink composition is more preferably adjust to a range of 8.5 to 10.0.

Water or a mixture of water and a water-soluble organic solvent is preferably used as the main solvent in the yellow ink composition of the present invention.

The water here can be deionized water, ultrafiltration water, reverse osmosis water, distilled water, or the like. From the standpoint of long-term storage, it is preferable to use water that has undergone some kind of chemical sterilization treatment, such as with UV irradiation or by adding hydrogen peroxide.

When water is used as the main solvent in the yellow ink composition of the present invention, the amount in which it is contained is preferably 40 to 90 wt %, and more preferably 50 to 80 wt %, with respect to the total weight of the ink composition.

The yellow ink composition of the present invention can further contain at least one type of humectant selected from among sugars and water-soluble organic solvents whose evaporation pressure is lower than that of pure water.

If a humectant is contained, it will suppress the evaporation of moisture and keep the ink moist in an inkjet recording method. Also, if it is a water-soluble organic solvent, it will improve the discharge stability and allow the viscosity to be easily changed without affecting the ink characteristics.

The water-soluble organic solvent is a medium having the ability to dissolve a solute, and is chosen from among water-soluble solvents that are organic and whose evaporation pressure is lower than that of water. Specific, favorable examples include ethylene glycol, propylene glycol, glycerin, 1,2,6-hexanetriol, diethylene glycol, triethylene glycol, dipropylene glycol, and other such polyhydric alcohols; acetonylacetone and other such ketones; gamma-butyrolactone, triethyl phosphate, and other such esters; and furfuryl alcohol, tetrahydrofurfuryl alcohol, and thiodiglycol. Maltitol, sorbitol, gluconolactone, maltose, and other such sugars are also favorable.

The humectant is preferably added in an amount of 5 to 50 wt %, and more preferably 5 to 30 wt %, and even more preferably 5 to 20 wt %, with respect to the total amount of the ink composition. Humectant properties will be obtained as long as the amount is at least 5 wt %, and it will be easy to adjust the composition to a viscosity that can be used for inkjet recording if the amount is no more than 50 wt %.

Also, the yellow ink composition of the present invention preferably contains a nitrogen-containing organic solvent as the solvent. Examples of nitrogen-containing organic solvents include 1,3-dimethyl-2-imidazolidinone, 2-pyrrolidone, N-methyl-2-pyrrolidone, and epsilon-caprolactam, of which 2-pyrrolidone is preferred. These can be used singly or in combinations of two or more types.

The content thereof is preferably 0.5 to 10 wt %, and more preferably 1 to 50 wt %, and even more preferably 1 to 5 wt %, with respect to the total amount of the ink composition. The addition will increase the solubility of the components if the amount is at least 0.5 wt %, and the materialfastness with the various members that come into contact with the ink composition will not suffer if the amount is kept to 10 wt % or less.

It is also preferable for the yellow ink composition of the present invention to contain a nonionic surfactant as an additive that is effective at maintaining the circularity of each dot while at the same time affording rapid ink fixing (penetrability).

An example of the nonionic surfactant used in the present invention is an acetylene glycol-based surfactant. Specific examples of acetylene glycol-based surfactants include Surfinol 465 and Surfinol 104 (trade names of Air Products and Chemicals), and Orfin STG and Orfin E1010 (trade names of Nissin Chemical Industry). The added amount thereof is preferably 0.1 to 5 wt %, and more preferably 0.4 to 2.0 wt %, with respect to the total amount of the ink composition. Sufficient penetrability will be obtained if the added amount is at least 1 wt %, and image bleed can be prevented more easily if the amount is no more than 5 wt %.

A glycol ether may also be added as a penetration enhancer in addition to a nonionic surfactant, which will further increase penetrability and will also reduce bleeding at the boundary with adjacent ink colors when color printing is performed, and this allows an extremely sharp image to be obtained. Examples of glycol ethers that can be used in the present invention include ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol monobutyl ether, and triethylene glycol monobutyl ether. The added amount thereof is preferably 3 to 30 wt %, and more preferably 5 to 15 wt %, with respect to the total amount of the ink composition. Bleeding will be sufficiently prevented if the added amount is at least 3 wt %, and keeping the amount to 30 wt % or less will make it easier to prevent bleeding of the image and easier to ensure storage stability of the ink.

Furthermore, the ink composition of the present invention may contain as needed a pH regulator such as triethanolamine or an alkali metal hydroxide; a hydrotropic agent; a water-soluble polymer such as sodium alginate; or a water-soluble resin, a fluorine-based surfactant, a preservative, a mold inhibitor, a rustproofing agent, or the like.

Examples of preservatives and mold inhibitors include sodium benzoate, sodium pentachlorophenol, sodium 2-pyridinethiol-1-oxide, sodium sorbate, sodium dehydroacetate, and 1,2-dibenzisothiazolin-3-one (Proxel CRL, Proxel BDN, Proxel GXL, Proxel XL-2, and Proxel TN made by Avecia).

Examples of pH regulators, dissolution auxiliaries, and antioxidants include diethanolamine, triethanolamine, propanolamine, morpholine, and other such amines and modified amines; potassium hydroxide, sodium hydroxide, lithium hydroxide, and other such metal hydroxides; ammonium hydroxide, potassium carbonate, sodium carbonate, lithium carbonate, and other such carbonates, phosphates, and so forth; N-methyl-2-pyrrolidone, 2-pyrrolidone, and other such pyrrolidones; allophanate, methyl allophanate, and other such allophanates; biuret, dimethylbiuret, tetramethylbiuret, and other such biurets; and L-ascorbic acid and salts thereof.

The above-mentioned optional components can be used singly in the ink composition of the present invention, or a plurality of types can be selected from within each group, or among groups, and mixed.

With the yellow ink composition of the present invention the amounts of all the components of the ink composition are preferably selected such that the viscosity of the ink composition at 20° C. will be between 2 and 10 mPa·s.

The surface tension of the yellow ink composition of the present invention at 20° C. is preferably no more than 45 mN/m, and more preferably 25 to 45 mN/m.

An example of a method for preparing the yellow ink composition of the present invention is to thoroughly mix and dissolve the components, subject the mixture to pressurized filtration through a membrane filter with a pore diameter of about 0.8 μm, and then use a vacuum pump to deaerate the filtrate.

The ink set of the present invention consists of an ink cartridge in which the yellow ink composition of the present invention is contained, either integrally or separately, along with ink compositions of other colors besides yellow, such as a magenta ink composition, a cyan ink composition, and a black ink composition, and except for the fact that the yellow ink composition of the present invention is contained, the ink set of the present invention can be made into an ink cartridge by applying a conventional method.

The recording method of the present invention in which the above-mentioned ink composition is used will now be described.

The recording method of the present invention can be used especially favorably as an inkjet recording method in which recording is performed by discharging the above-mentioned ink composition of the present invention as droplets from tiny holes, and causing these droplets to adhere to a recorded medium, but it should go without saying that it can also be used in standard applications such as writing instruments, recording meters, and pen plotters.

Any conventional method can be used as the inkjet recording method, and in particular it is possible to use a method in which droplets are discharged by utilizing the vibration of piezoelectric elements (a recording method featuring an inkjet head that forms ink droplets by the mechanical deformation of piezoelectric elements), or an excellent image can be recorded with a method that utilizes thermal energy.

EXAMPLES

The present invention will now be described in more specific terms by giving examples. The present invention is not limited in any way by the materials, compositions, and production methods referred to in the following examples.

Examples 1 to 13

A compound A expressed by the following Formula IV, which is one of the compounds (yellow colorants) expressed by the above-mentioned Formula I, a compound B expressed by the following Formula V, which is one of the compounds (yellow colorants) expressed by the above-mentioned Formula II, and the compounds given in Table 1 were mixed in the proportions given in Table 1, and the components were dissolved and then filtered under pressure through a membrane filter with a pore diameter of 1 μm to prepare the ink compositions of Examples 1 to 13. Examples 1 to 13 are shown as reference examples.

[C4]

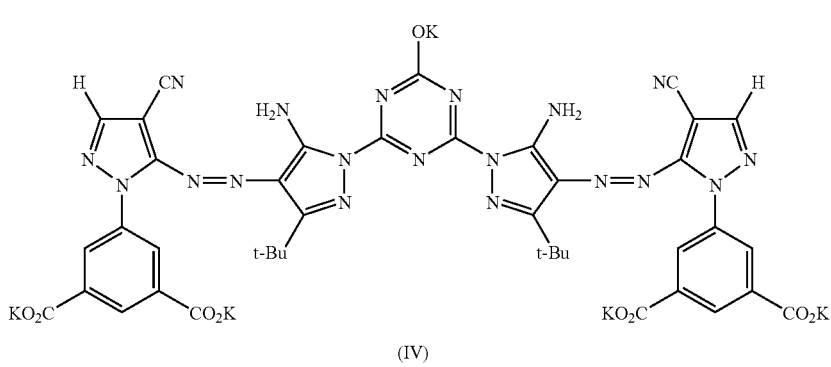

(IV)

[C5]

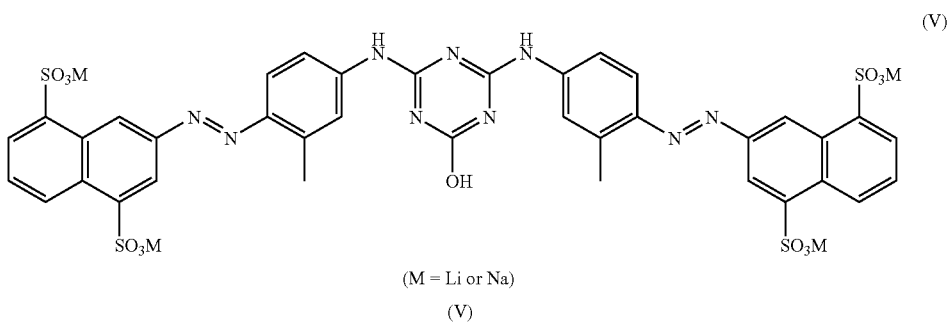

(M = Li or Na)

(V)

(In Formula V, M is Li or Na.)

The C.I. Direct Yellow 86 and C.I. Direct Yellow 173 used in the ink compositions of Examples 7 to 13 were conventional yellow dyes. The total of the colorant solids in the working examples here is equal to the combined proportions of the colorant components in Table 1.

TABLE 1

(units: % wt %)

| | | Example Number | | | | | | |
|---|---|---|---|---|---|---|---|---|
| | | 1 | 2 | 3 | 4 | 5 | 6 | 7 |
| Colorant | Compound A (Substance of the above-mentioned Formula IV) | 4 | 3 | 2 | 1 | 5 | 0 | 0 |
| | Compound B (Substance of the above-mentioned Formula V) | 1 | 2 | 3 | 4 | 0 | 4 | 0 |
| | C.I. Direct Yellow 86 | 0 | 0 | 0 | 0 | 0 | 0 | 4 |
| | C.I. Direct Yellow 173 | 0 | 0 | 0 | 0 | 0 | 0 | 0 |
| Organic solvent | Triethylene glycol monobutyl ether | 10 | 10 | 10 | 10 | 10 | 10 | 10 |
| | Glycerol | 10 | 10 | 10 | 10 | 10 | 10 | 10 |
| | Triethylene glycol | 5 | 5 | 5 | 5 | 5 | 5 | 5 |
| | 2-Pyrrolidone | 5 | 5 | 5 | 5 | 5 | 5 | 5 |
| Alkali | Triethanolamine | 0.4 | 0.4 | 0.4 | 0.4 | 0.4 | 0.4 | 0.4 |
| Surfactant | Orfin E1010[*1] | 0.8 | 0.8 | 0.8 | 0.8 | 0.8 | 0.8 | 0.8 |
| Rustproofing agent | Benzotriazole | 0.01 | 0.01 | 0.01 | 0.01 | 0.01 | 0.01 | 0.01 |
| Mold inhibitor | Proxel XL-2[*2] | 0.3 | 0.3 | 0.3 | 0.3 | 0.3 | 0.3 | 0.3 |
| Chelating agent | Disodium ethylenediamine tetraacetate | 0.0 2 | 0.0 2 | 0.0 2 | 0.0 2 | 0.0 2 | 0.0 2 | 0.0 2 |
| Other | Ultrapure water | 63.47 | 63.47 | 63.47 | 63.47 | 63.47 | 64.47 | 64.47 |
| Total | | 100 | 100 | 100 | 100 | 100 | 100 | 100 |

| | | Example Number | | | | | |
|---|---|---|---|---|---|---|---|
| | | 8 | 9 | 10 | 11 | 12 | 13 |
| Colorant | Compound A (Substance of the above-mentioned Formula IV) | 0 | 3 | 3 | 0 | 0 | 0 |

TABLE 1-continued

|   |   |   |   |   |   |   |   |
|---|---|---|---|---|---|---|---|
|   | Compound B (Substance of the above-mentioned Formula V) | 0 | 0 | 0 | 2.5 | 2.5 | 0 |
|   | C.I. Direct Yellow 86 | 0 | 2 | 0 | 2 | 0 | 2.5 |
|   | C.I. Direct Yellow 173 | 6 | 0 | 3 | 0 | 3 | 3 |
| Organic solvent | Triethylene glycol monobutyl ether | 10 | 10 | 10 | 10 | 10 | 10 |
|   | Glycerol | 10 | 10 | 10 | 10 | 10 | 10 |
|   | Triethylene glycol | 5 | 5 | 5 | 5 | 5 | 5 |
|   | 2-Pyrrolidone | 5 | 5 | 5 | 5 | 5 | 5 |
| Alkali | Triethanolamine | 0.4 | 0.4 | 0.4 | 0.4 | 0.4 | 0.4 |
| Surfactant | Orfin E1010*[1] | 0.8 | 0.8 | 0.8 | 0.8 | 0.8 | 0.8 |
| Rustproofing agent | Benzotriazole | 0.01 | 0.01 | 0.01 | 0.01 | 0.01 | 0.01 |
| Mold inhibitor | Proxel XL-2*[2] | 0.3 | 0.3 | 0.3 | 0.3 | 0.3 | 0.3 |
| Chelating agent | Disodium ethylenediamine tetraacetate | 0.0 2 | 0.0 2 | 0.0 2 | 0.0 2 | 0.0 2 | 0.0 2 |
| Other | Ultrapure water | 62.47 | 63.47 | 62.47 | 63.97 | 62.92 | 62.97 |
| Total |   | 100 | 100 | 100 | 100 | 100 | 100 |

*[1]Made by Nissin Chemical Industry.
*[2]Made by Arch Chemicals Japan

Printing of Recorded Matter

The ink compositions of the above Examples 1 to 13 were each put into a dedicated cartridge (yellow chamber) of a PM-A700 inkjet printer (made by Seiko-Epson), printing was performed on a special inkjet recording medium (Crispia photographic paper (high gloss), made by Seiko-Epson, model number KA420SCK, and various evaluation tests were conducted.

Lightfastness Test

Using the above-mentioned cartridge filled with each of the ink compositions of Examples 1 to 13, printing was performed with the duty adjusted so that the optical density (OD) would be within a range of 0.9 to 1.1. The printed matter thus obtained was allowed to stand for 1 day at normal temperature and humidity and away from direct sunlight, after which its lightfastness was evaluated under the following conditions.

Five samples of each printed matter were irradiated for 5, 9, 14, 21, 28, and 48 days[2] at a luminance of 70,000 lux, a temperature of 24° C., and a relative humidity of 60%, using an XL-75 xenon weatherproofness tester (made by Suga Test Instruments). After exposure, the OD of each piece of printed matter was measured with a Spectrolino reflection densitometer (made by Gretag), the residual optical density (ROD) was determined from the following equation, and this was evaluated according to the following rating criteria.

[First Mathematical Formula]

$$ROD(\%) = (D/D_0) \times 100$$

D: OD after exposure test
$D_0$: OD before exposure test (Measurement conditions comprised using a blue filter, a D50 light source, and an angle of visibility of 2 degrees.)

The number of days of exposure was plotted on the horizontal axis of a graph, and the resulting ROD on the vertical axis, to find the approximation curve for fading of each sample of printed matter. The time it took for the ROD to decrease to 70% was found from the approximation formula thus obtained, and the lightfastness was evaluated according to the following rating criteria, the results of which are given in Table 2.

Rating Criteria

Evaluation A: ROD did not decrease to 70% until 40 days had elapsed

Evaluation B: It took more than 30 days, but no more than 40 days, for ROD to decrease to 70%.

Evaluation C: It took more than 25 days, but no more than 30 days, for ROD to decrease to 70%.

Evaluation D: It took more than 20 days, but no more than 25 days, for ROD to decrease to 70%.

Evaluation E: It took more than 10 days, but no more than 20 days, for ROD to decrease to 70%.

Evaluation F: It took no more than 10 days for ROD to decrease to 70%.

Gasfastness (Ozonefastness) Evaluation Test

Using a cartridge filled with each of the ink compositions of Examples 1 to 13, printing was performed with the duty adjusted so that the optical density (OD) would be within a range of 0.9 to 1.1. The printed matter thus obtained was allowed to stand for 1 day at normal temperature and humidity and away from direct sunlight, after which its ozonefastness was evaluated under the following conditions.

Five samples of each printed matter were exposed for 8, 12, 16, 20, and 24 hours at an ozone concentration of 40 ppm, a temperature of 24° C., and a relative humidity of 60%, using an OMS-H ozone weather-o-meter tester (made by Suga Test Instruments). After exposure, the OD of each piece of printed matter was measured with a Spectrolino reflection densitometer (made by Gretag), the residual optical density (ROD) was determined from the following equation, and this was evaluated according to the following rating criteria.

[Second Mathematical Formula]

$$ROD(\%) = (D/D_0) \times 100$$

D: OD after exposure test
$D_0$: OD before exposure test (Measurement conditions comprised using a blue filter, a D50 light source, and an angle of visibility of 2 degrees.)

The exposure time was plotted on the horizontal axis of a graph, and the resulting ROD on the vertical axis, to find the approximation curve for fading of each sample of printed matter. The time it took for the ROD to decrease to 70% was found from the approximation formula thus obtained, and the ozonefastness was evaluated according to the following rating criteria, the results of which are given in Table 2.

Rating Criteria

Evaluation A: ROD did not decrease to 70% until 24 hours had elapsed

Evaluation B: It took more than 20 hours, but no more than 24 hours, for ROD to decrease to 70%.

Evaluation C: It took more than 16 hours, but no more than 20, for ROD to decrease to 70%.

Evaluation D: It took more than 12 hours, but no more than 16 hours, for ROD to decrease to 70%.

Evaluation E: It took more than 8 hours, but no more than 12 hours, for ROD to decrease to 70%.

Evaluation F: It took no more than 8 hours for ROD to decrease to 70%.

Hue Evaluation Test

Using the above-mentioned cartridge filled with each of the ink compositions from Examples 1 to 13, printing was performed with the duty adjusted to 50%, 60%, 70%, or 100%. The printed matter thus obtained was allowed to stand for 1 day at normal temperature and humidity and away from direct sunlight, after which the hue of the printed matter thus obtained was examined and rated visually, the results of which are given in Table 2.

TABLE 2

| | Example Number | | | | | | |
|---|---|---|---|---|---|---|---|
| | 1 | 2 | 3 | 4 | 5 | 6 | 7 |
| Lightfastness | A | A | B | B | A | C | F |
| Gasfastness (ozonefastness) | A | B | B | C | A | D | A |
| Hue | somewhat green | slightly green | somewhat red | quite red | quite green | extremely red | quite red |

| | Example Number | | | | | |
|---|---|---|---|---|---|---|
| | 8 | 9 | 10 | 11 | 12 | 13 |
| Lightfastness | F | D | E | E | F | F |
| Gasfastness (ozonefastness) | A | A | A | C | C | A |
| Hue | quite green | somewhat red | quite green | quite red | somewhat red | somewhat red |

As is clear from Table 2, the hue of the yellow ink compositions of Examples 1 to 4 (ink compositions of the present invention), containing both a compound expressed by Formula IV (compound A) and a compound expressed by Formula V (compound B) as yellow colorants, could be adjusted by changing the compound B content, and it is also clear that the lightfastness of these inks is particularly superior to that of the yellow ink compositions whose hue was adjusted by a combination other than compound A and compound B (Examples 9 to 12), or yellow ink compositions containing neither compound A nor compound B (Examples 7, 8, and 13).

When compound A and compound B were used together as colorants, the ozonefastness did decrease compared to when the ink contained compound A alone (Example 5), but the ozonefastness was comparable to that of a cyan ink or magenta ink produced by the latest technology and evaluated by the same method and evaluation criteria as above (this corresponds to "evaluation C" in the ozonefastness rating criteria listed above), and when uniform fading of the various colors is taken into account, this is not a drawback. In fact, in terms of performance as an ink set, even if fading does occur, discoloration is unlikely to occur, so this is useful.

Also, the ink in which compound B alone was used as a colorant (Example 6) did have better lightfastness than the inks in which conventional dyes were used (Examples 7 to 13), but the level compared unfavorably to the lightfastness of a cyan ink or magenta ink produced by the latest technology, which confirms the usefulness of the inks in which both compound A and compound B were used (Examples 1 to 4).

What is claimed is:

1. A yellow ink composition, containing as a colorant at least one compound expressed by the following Formula I, and at least one compound expressed by the following Formula II:

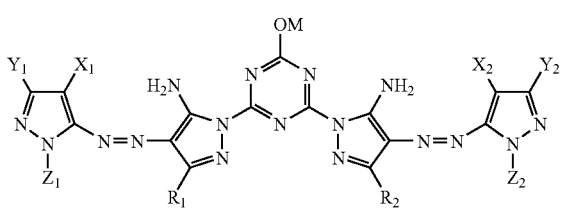

(I)

where $X_1$, $X_2$, $Y_1$, and $Y_2$ are each a hydrogen atom or a cyano group, $Z_1$ and $Z_2$ are each a substituent having an aromatic ring, $R_1$ and $R_2$ are each an alkyl group, and M is a metal atom;

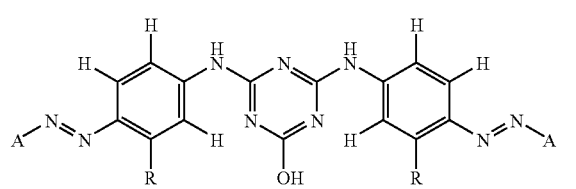

(II)

where R is a methoxy group or methyl group, and A is 1,5-disulfonaphtho-3-yl or 1,5,7-trisulfonaphtho-2-yl.

2. The yellow ink composition according to claim 1, wherein the compound expressed by Formula I is a compound expressed by the following Formula III:

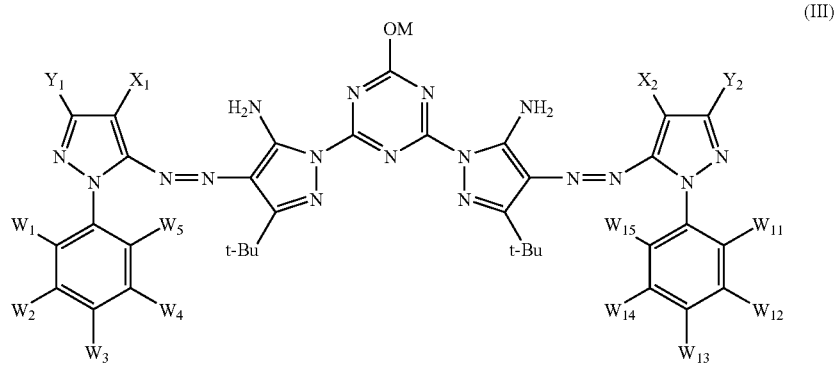

(III)

where $X_1$, $X_2$, $Y_1$, and $Y_2$ are each a hydrogen atom or a cyano group, $W_1$ to $W_5$ and $W_{11}$ to $W_{15}$ are each a hydrogen atom or a carboxyl group or salt thereof, M is a metal atom, and t-Bu is a tertiary butyl group.

3. The yellow ink composition according to claim 1, containing 0.3 to 7 wt % the at least one type of compound expressed by Formula I and 0.3 to 6.0 wt % the at least one type of compound expressed by Formula II, with respect to the total weight of the ink composition.

4. The yellow ink composition according to claim 1, wherein the combined amount of colorant solids is from 0.6 to 7.0 wt % with respect to the total weight of the ink composition.

5. The yellow ink composition according to claim 1, wherein the content ratio between the compound expressed by Formula I and the compound expressed by Formula II is a weight ratio between 5:1 and 1:5.

6. The yellow ink composition according to claim 1, wherein the ink composition includes a nonionic surfactant.

7. The yellow ink composition according to claim 6, wherein the nonionic surfactant is an acetylene glycol-based surfactant.

8. The yellow ink composition according to claim 6, wherein the nonionic surfactant is contained in an amount of 0.1 to 5.0 wt % with respect to the total weight of the ink composition.

9. The yellow ink composition according to claim 1, wherein the ink composition includes a penetration enhancer.

10. The yellow ink composition according to claim 9, wherein the penetration enhancer is a glycol ether.

11. An ink set for inkjet recording comprising a plurality of ink compositions including the yellow ink composition according to claim 1.

12. An ink cartridge, wherein the ink set according to claim 11 is accommodated integrally or independently therein.

13. An inkjet recording method for performing recording by discharging droplets of an ink composition and causing the droplets to adhere to a recording medium, wherein recording is performed with the ink set according to claim 11.

14. Recorded matter, printed by the inkjet recording method according to claim 13.

15. An inkjet recording method for performing recording by discharging droplets of an ink composition and causing the droplets to adhere to a recording medium, wherein the recording is performed with the ink cartridge according to claim 12.

* * * * *